US012639994B2

(12) United States Patent
Monninger et al.

(10) Patent No.: US 12,639,994 B2
(45) Date of Patent: May 26, 2026

(54) METHOD, ELECTRONIC DEVICE, AND AUTONOMOUS DRIVING SYSTEM FOR ERROR EVENT ANALYSIS

(71) Applicant: Mercedes-Benz Group AG, Stuttgart (DE)

(72) Inventors: Thomas Monninger, Menlo Park, CA (US); Aaron Brown, Santa Clara, CA (US)

(73) Assignee: Mercedes-Benz Group AG, Stuttgart (DE)

( * ) Notice: Subject to any disclaimer, the term of this patent is extended or adjusted under 35 U.S.C. 154(b) by 147 days.

(21) Appl. No.: 18/508,347

(22) Filed: Nov. 14, 2023

(65) Prior Publication Data

US 2025/0157271 A1      May 15, 2025

(51) Int. Cl.
*G07C 5/08*          (2006.01)
*G06F 11/07*          (2006.01)

(52) U.S. Cl.
CPC ........ *G07C 5/0816* (2013.01); *G06F 11/0739* (2013.01); *G06F 11/079* (2013.01); *G06F 11/0793* (2013.01)

(58) Field of Classification Search
CPC . G07C 5/0816; G06F 11/0739; G06F 11/079; G06F 11/0793
USPC .......................................................... 714/26
See application file for complete search history.

(56) References Cited

U.S. PATENT DOCUMENTS

| | | | |
|---|---|---|---|
| 6,615,367 B1 * | 9/2003 | Unkle ................ | G05B 23/0229 |
| | | | 706/46 |
| 8,407,166 B2 | 3/2013 | Hawkins et al. | |
| 8,504,570 B2 | 8/2013 | Hawkins et al. | |
| 8,645,291 B2 | 2/2014 | Hawkins et al. | |
| 9,552,551 B2 | 1/2017 | Marianetti, II et al. | |
| 10,275,720 B2 | 4/2019 | Hawkins et al. | |
| 2004/0015880 A1 * | 1/2004 | Floyd .................. | G06F 11/3636 |
| | | | 714/39 |
| 2014/0129499 A1 | 5/2014 | Hawkins | |
| 2015/0127595 A1 | 5/2015 | Hawkins, II et al. | |
| 2016/0321557 A1 | 11/2016 | Hawkins et al. | |

(Continued)

FOREIGN PATENT DOCUMENTS

| | | | | |
|---|---|---|---|---|
| WO | 2009152459 A1 | 12/2009 | | |
| WO | WO-2021063486 A1 * | 4/2021 | ............. | G06N 20/00 |

*Primary Examiner* — Ashish Thomas
*Assistant Examiner* — Catherine Marie Nguyen
(74) *Attorney, Agent, or Firm* — ANOVA LAW GROUP, PLLC

(57)                ABSTRACT

A method for error event analysis performed by an electronic device includes: in response to an error event of an autonomous driving system, feeding a sequence of signal states, collected from the autonomous driving system into a prediction model, where the prediction model is trained based on signal states collected from a plurality of autonomous driving systems for predicting, based on a first signal state, a second signal state, the first signal state representing signals collected at a first time, and the second signal state representing signals collected at a second time succeeding the first time; converting the error event into an event signal state having signal values at an event time; comparing the second signal state with the event signal state; and in response to the second signal state matching the event signal state, tracing the error event back to the first signal state as a root cause.

18 Claims, 5 Drawing Sheets

(56)        References Cited

U.S. PATENT DOCUMENTS

| | | | |
|---|---|---|---|
| 2018/0060225 A1* | 3/2018 | Tao | G06F 11/3692 |
| 2018/0312180 A1* | 11/2018 | Wang | B61L 15/009 |
| 2019/0236862 A1* | 8/2019 | Mercep | G08G 1/165 |
| 2019/0383631 A1* | 12/2019 | Bigio | G06V 20/59 |
| 2020/0001868 A1* | 1/2020 | Lee | G07C 5/008 |
| 2020/0097857 A1 | 3/2020 | Hawkins et al. | |
| 2020/0327322 A1 | 10/2020 | Hawkins et al. | |
| 2021/0223780 A1* | 7/2021 | Bramley | G06N 3/04 |
| 2022/0027230 A1* | 1/2022 | Burch | G06F 11/0778 |
| 2022/0108156 A1 | 4/2022 | Hunter et al. | |
| 2022/0108157 A1 | 4/2022 | Hunter et al. | |
| 2023/0004800 A1 | 1/2023 | Hunter et al. | |
| 2024/0012731 A1* | 1/2024 | Segal | G06F 11/3476 |

* cited by examiner

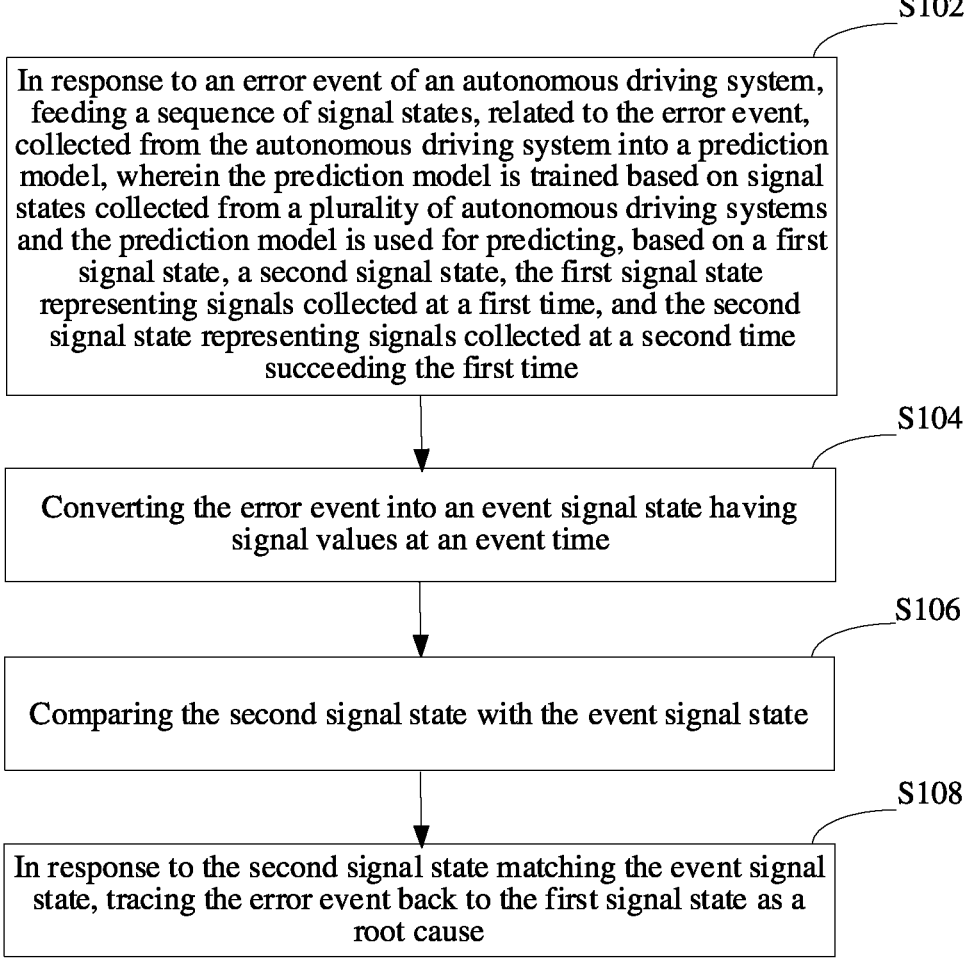

S102

In response to an error event of an autonomous driving system, feeding a sequence of signal states, related to the error event, collected from the autonomous driving system into a prediction model, wherein the prediction model is trained based on signal states collected from a plurality of autonomous driving systems and the prediction model is used for predicting, based on a first signal state, a second signal state, the first signal state representing signals collected at a first time, and the second signal state representing signals collected at a second time succeeding the first time

S104

Converting the error event into an event signal state having signal values at an event time

S106

Comparing the second signal state with the event signal state

S108

In response to the second signal state matching the event signal state, tracing the error event back to the first signal state as a root cause

METHOD, ELECTRONIC DEVICE, AND AUTONOMOUS DRIVING SYSTEM FOR ERROR EVENT ANALYSIS

TECHNICAL FIELD

The present disclosure relates to the technical field of data processing and, more particularly, to a method, an electronic device, and autonomous driving system for error event analysis.

BACKGROUND

Performing forensics evaluation on autonomous driving systems and identifying a root cause for an error event can be time-consuming and labor intensive. Recorded sensor measurement data (also referred to as signals) from autonomous driving systems can be very complex and structured in a way that makes it difficult for a human to parse. The signals are often arranged sequentially in time. The signals collected at a time T are also called a signal state at the time T. Each signal is timestamped. The error event often corresponds to an event signal state that is a special signal state that captures signal values at the time when the error event occurs.

To best analyze the signals to trace back a root cause for the error event, it is important to establish correlations between signal states that can be verified to be highly predictable. Well-established correlations between the signal states (also referred to as patterns) can act as an estimation for causality between the signal states and can be used to trace back the error event to a root cause signal state. The present disclosure provides a method for error event analysis. The method automatically traces back the error event to root cause signal state by finding correlations or patterns among a huge number of various dynamic signal states collected from the autonomous driving system where the error event occurs. The method significantly cuts down time and effort of identifying the root cause signal state for the error event, thereby providing accurate guidance to prevent the error event from reoccurring.

SUMMARY

One aspect of the present disclosure provides a method for error event analysis. The method includes: in response to an error event of an autonomous driving system, feeding a sequence of signal states, related to the error event, collected from the autonomous driving system into a prediction model, where the prediction model is trained based on signal states collected from a plurality of autonomous driving systems and the prediction model is used for predicting, based on a first signal state, a second signal state, the first signal state representing signals collected at a first time, and the second signal state representing signals collected at a second time succeeding the first time; converting the error event into an event signal state having signal values at an event time; comparing the second signal state with the event signal state; and in response to the second signal state matching the event signal state, tracing the error event back to the first signal state as a root cause.

Another aspect of the present disclosure provides an electronic device for error event analysis. The electronic device includes a processor and a memory coupled to the processor and storing program instructions, where when being executed by the processor, the program instructions cause the processor to: in response to an error event of an autonomous driving system, feed a sequence of signal states, related to the error event, collected from the autonomous driving system into a prediction model, where the prediction model is trained based on signal states collected from a plurality of autonomous driving systems and the prediction model is used for predicting, based on a first signal state, a second signal state, the first signal state representing signals collected at a first time, and the second signal state representing signals collected at a second time succeeding the first time; convert the error event into an event signal state having signal values at an event time; compare the second signal state with the event signal state; and in response to the second signal state matching the event signal state, trace the error event back to the first signal state as a root cause.

Another aspect of the present disclosure provides an autonomous driving system. The autonomous driving system includes an electronic device for error event analysis. The electronic device includes a processor and a memory coupled to the processor and storing program instructions, where when being executed by the processor, the program instructions cause the processor to: in response to an error event of an autonomous driving system, feed a sequence of signal states, related to the error event, collected from the autonomous driving system into a prediction model, where the prediction model is trained based on signal states collected from a plurality of autonomous driving systems and the prediction model is used for predicting, based on a first signal state, a second signal state, the first signal state representing signals collected at a first time, and the second signal state representing signals collected at a second time succeeding the first time; convert the error event into an event signal state having signal values at an event time; compare the second signal state with the event signal state; and in response to the second signal state matching the event signal state, trace the error event back to the first signal state as a root cause.

Other aspects of the present disclosure can be understood by those skilled in the art in light of the description, the claims, and the drawings of the present disclosure.

BRIEF DESCRIPTION OF THE DRAWINGS

To more clearly illustrate the technical solutions in embodiments of the present disclosure, the drawings used in the description of the disclosed embodiments are briefly described hereinafter. Other drawings may be derived from such drawings by a person with ordinary skill in the art without creative efforts and may be encompassed in the present disclosure.

FIG. 1 illustrates a flowchart of an exemplary method for automatically tracing an error event in signals collected from an autonomous driving system according to some embodiments of the present disclosure.

DETAILED DESCRIPTION OF THE EMBODIMENTS

Figure 2:
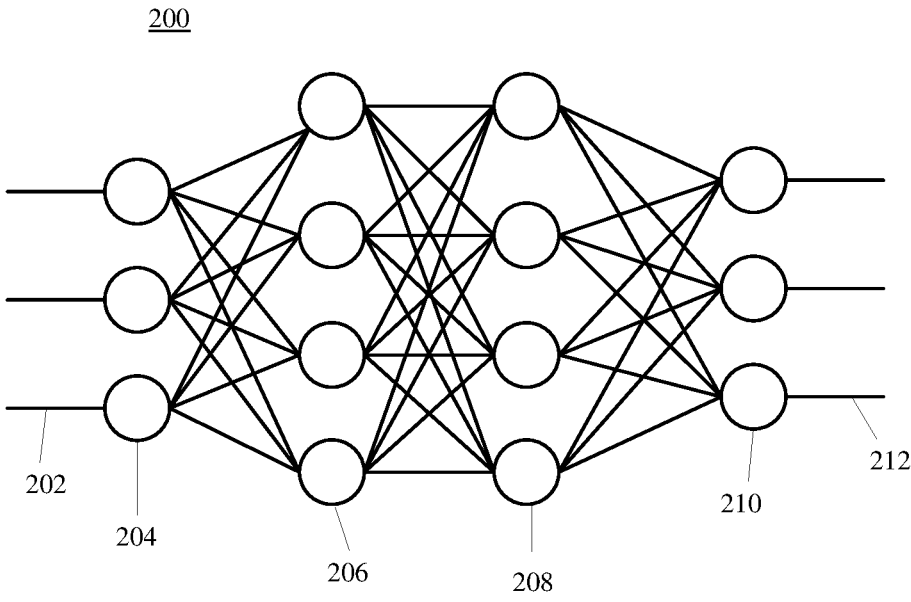
FIG. 2 illustrates a block diagram of an exemplary prediction model according to some embodiments of the present disclosure.

Technical solutions of the present disclosure will be described below with reference to the accompanying drawings. It should be understood that the embodiments are provided to enable a more thorough understanding of the present disclosure and to fully convey the scope of the present disclosure to those skilled in the art, and the present disclosure can be implemented in various forms and should not be limited by the embodiments set forth herein.

An autonomous driving system (also referred to as automated driving system) is a vehicle or otherwise configured in a vehicle, and capable of sensing its environment and operation without human driver intervention. The autonomous driving system can operate as any vehicles, e.g., an electric vehicle (EV), an internal combustion engine (ICE) vehicle, and/or a hydrogen fuel cell vehicle, and can autonomously drive without having ordinary human driver. Tremendous efforts in development and testing are required to achieve autonomous driving capability.

For example, in the United States, the autonomous driving system has 6 levels of autonomy. The 6 levels of autonomy include level 0 with no driving automation, level 1 with driver assistance, level 2 with partial driving automation, level 4 with high driving automation, and level 5 with full driving automation. The present disclosure does not limit the level of autonomy of the autonomous driving system and may be applied to any regions and countries accordingly.

Error events may occur during operation of the autonomous driving system and it is important to find out a root cause for each error event. When diagnosing a root cause for an error event, signals measured by sensors of the autonomous driving system and recorded in real-time need to be analyzed. Due to the enormous amount of the recorded signals, a prediction model based on machine learning technologies may be used to provide swift, accurate, and consistent diagnosis.

The error events may include, for example, failing to stop at a stop sign, lane departure, hitting orange cones. In one example, the error event is failing to stop at a stop sign. There may be multiple reasons for this to happen. For example, the camera does not see the stop sign due to sun glare, or the map says there is no stop sign at this location, or the camera sees the stop sign but interprets the stop sign to be associated with a lane different from the lane at which the autonomous driving system is located. Based on the signal states collected from the autonomous driving system, the method is able to trace back to the exact root cause for this error event.

In another example, the error event is lane departure. There may be multiple reasons for this to happen. For example, the camera does not detect lane divider marks, or the camera is not properly calibrated and misinterprets the location of the lane divider marks, or the map provide incorrect lane information, or the lane divider marks are worn out. Based on the signal states collected from the autonomous driving system, the method is able to trace back to the exact root cause for this error event.

In another example, the error event is hitting orange cones. There may be multiple reasons for this to happen. For example, the camera does not detect the orange cones, or the camera is not properly calibrated and misinterprets the location of the orange cones, or an incorrect judgement that there is enough space to dodge the orange cones. Based on the signal states collected from the autonomous driving system, the method is able to trace back to the exact root cause for this error event.

In some embodiments, the autonomous driving system is a vehicle. The vehicle includes sensors to collect signals that reflect operation status of various modules and components of the vehicle. For example, the signals may include a plurality of vehicle parameters and a plurality of vehicle control parameters. The plurality of vehicle parameters may include run-time parameters. A run-time parameter may be a parameter which describes or affects run-time behavior of the vehicle, where the run-time behavior may refer to the vehicle being driven. For example, the run-time parameters may include an acceleration pedal position, a steering wheel position, a vehicle weight distribution, a road surface condition, an observed traction, a shock distribution, a brake position, a torque vector, a battery availability, a window position, a motor temperature, a battery temperature, a gyro measurement, an accelerator measurement, a suspension position, a throttle position, a brake position, and regeneration settings.

In some embodiments, the vehicle includes image sensors to collect image signals that capture ambient environment status. In this case, the images signals may be pre-processed to obtain one or more abstraction signals. For example, image signals captured by image sensors (i.e., cameras) may be processed to obtain a lane departure signal, a stop sign signal, and/or an orange cone signal. It will be the lane departure signal, the stop sign signal, and/or the orange cone signal rather the image signals, that will be analyzed in the error event root cause analysis. As such, the signals collected from the autonomous driving system include not only raw sensor measurement data but also the abstraction signals.

In some embodiments, the autonomous driving system may be an electric vehicle (EV) or an internal combustion engine (ICE) vehicle. The EV or ICE vehicle may include modules with multiple sensors. Under certain circumstances, it makes sense to identify a module rather than a small component inside the module monitored by a sensor as a result of the root cause analysis. This is referred to as signal grouping. The signal grouping is useful for the following reasons. For example, an action for remedying the error event is more likely to replace the entire module rather than a small component of the module. In another example, the module where the root cause resides may be supplied by a third-party supplier. The manufacturer of the autonomous driving system may not be able to perform any maintenance action on an individual component of the module. So, it is sufficient to identify the entire module in the root cause analysis.

The plurality of vehicle control parameters may include a target acceleration or deceleration, target drive wheels, target traction settings, target handling characteristics, a target turn angle, a target steering ratio, a target weight distribution, and a target wheelbase. The plurality of vehicle parameters of the autonomous driving system may further include driving conditions of the autonomous driving system. For example, the driving conditions include at least location, data from rain/fog sensors, and camera feeds to understand terrain. The plurality of vehicle parameters of the autonomous driving system may further include local maps, local regulations and rules.

Due to differences of sensors in different autonomous driving systems, the sensor measurement data will be normalized before being fed into the prediction model to the error event root cause analysis. Similarly, the sensor measurement data will be pre-processed to accommodate sensor hardware differences before being used in training the prediction model.

During the operation of the autonomous driving system, the signals are collected in real-time and stored in a non-volatile memory of the autonomous driving system. The signals collected at a current time form a current signal state. The signals collected at a future time form a future signal state. The signals collected at a past time form a past signal state. The signals collected at a time T form a signal state at time T. Due to memory limitation of the autonomous driving system, the signals collected form the autonomous driving system may be uploaded to computer server located in a cloud. Further, the local regulations and/or rules may prevent the signals from leaving the autonomous driving system without certain restrictions. The signals may be tokenized, encrypted, and purged before being transmitted to the computer server located in the cloud. Personally identified information needs to be protected regardless of being stored in the autonomous driving system or being transmitted to the computer server located in the cloud.

An error event often corresponds to an event signal state that is a special signal state that captures signal values at the time when the error event occurs. In some embodiments, the error event may correspond to one or more signal values in the event signal state. For example, the error event is failing to stop at a stop sign. The event signal state corresponding to the error event may include a location signal of the autonomous driving system in proximity of the actual location of the stop sign, a lane signal indicating the autonomous driving system is located in a lane affected by the stop sign, and a speed of the autonomous driving system that is greater than a speed threshold.

In some embodiments, a user of an electronic device performing the method enters the event signal state based on the error event to trigger the electronic device to perform the error event root cause analysis.

The present disclosure provides a method for error event analysis of an autonomous driving system. The method may be performed by an electronic device. The electronic device may be installed in the autonomous driving system or may be a computer server located in a cloud. The signals to be analyzed are continuously collected from the autonomous driving system. The collected signals may be stored in the autonomous driving system or may be stored in the computer server in the cloud. The signals collected from a plurality of similar autonomous driving system are aggregated to train a prediction model that can be used to automatically trace an error event in the signals collected from the autonomous driving system.

In some embodiments, the signal states collected from a plurality of similar autonomous driving systems will be uploaded to a signal aggregation server where the signal states from the plurality of autonomous driving systems will be aggregated. The aggregated signal states will be used as unlabeled training data to train the prediction model.

FIG. 1 illustrates a flowchart of an exemplary method for error event analysis according to some embodiments of the present disclosure. As shown in FIG. 1, the method includes the following processes.

At S102, in response to an error event of an autonomous driving system, feeding a sequence of signal states, related to the error event, collected from the autonomous driving system into a prediction model, wherein the prediction model is trained based on signal states collected from a plurality of autonomous driving systems and the prediction model is used for predicting, based on a first signal state, a second signal state.

In some embodiments, the signals are collected from the autonomous driving system in a sequence of times to obtain a sequence of signal states. Each signal state is marked by a timestamp. The first signal state represents the signals collected at a first time, and the second signal state represents the signals collected at a second time succeeding the first time.

In some embodiments, the sequence of signal states includes measurement data measured by sensors of the autonomous driving system and are collected at a predetermined time interval from the autonomous driving system to become the sequence of signal states that are used in error event analysis. In addition, the sequence of signal states may further include abstraction signals that are extracted from the measurement data measured by sensors of the autonomous driving system and local knowledges including local maps and local rules and regulations.

The prediction model may be a neural network model capable of predicting the second signal state based on the first signal state. FIG. 2 illustrates a block diagram of an exemplary prediction model according to some embodiments of the present disclosure. As shown in FIG. 2, the neural network model 200 may include an input layer 204 for entering the past signal state 202, one or more hidden layers 206 and 208 that make the prediction of the current signal state, and an output layer 210 that outputs the predicted current signal state 212. Each of the one or more hidden layers includes a plurality of nodes or neurons that the modify signal values of the inputted past signal state. Each neuron is used to process the signal values of the inputted past signal state. Each neuron is assigned with a weight and a bias. The weight is a numerical value that can be derived through either supervised or unsupervised training.

In some embodiments, the prediction model is an AutoRegressive Integrated Moving Average (ARIMA) model. The signal states collected from the autonomous driving system are a sequence of signal values or time series signal values. The ARIMA model uses a mathematical model to represent the time series signal values. The ARIMA model uses the last m time series signal values as features. m is a hyperparameter that needs to be tuned. The ARIMA model also uses information on how well it has performed in the past, for example, the most recent n errors the ARIMA model made as features. n is a hyperparameter that needs to be tuned.

In some embodiments, the prediction model is a Long Short-Term Memory (LSTM) recurrent neural network (RNN) model. The neurons or cells in the LSTM RNN learn the important portion of the time series signal values and forget the less important portion of the time series signal values. This feature may be useful in a scenario that hardware and/or software upgrades have been applied to the plurality of similar autonomous driving systems. The signal states collected prior to the upgrade may be less important than the signal states collected after the upgrade.

In some embodiments, the prediction model is a Hierarchical Temporal Memory (HTM) model. HTM is a biological constrained machine learning technology developed by Numenta and is used for anomaly detection in data sequences or time series values. It is based on interaction of pyramidal neurons in the neocortex of the mammalian brain. The HTM model can store, learn, infer, and recall high-order data sequences. The HTM model constantly learns time-based patterns in unlabeled sequence data.

The HTM model includes a tree-shaped hierarchy of levels. Each level includes a plurality of smaller elements called regions or nodes. A higher hierarchy level often includes fewer regions than a lower hierarchy level. The higher hierarchy level reuses patterns learned at the lower level by combing them to memorize more complex patterns. The bottom level regions accept the signals or sensory data collected from the autonomous driving system when the HTM model is in a learning mode and an inference mode, and output the generated pattern of a given category. The top level includes a single region that stores the most general and most permanent category. Each region learns by identifying and memorizing spatial patterns and identifies temporal sequences of spatial patterns that are likely to occur sequentially.

Figure 3:
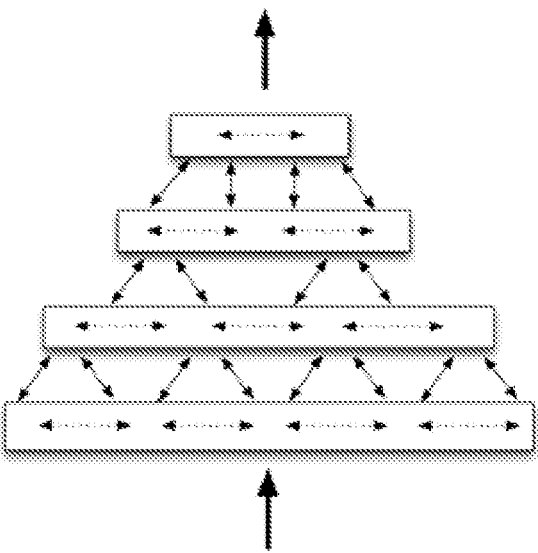
FIG. 3 illustrates a schematic diagram of an exemplary four-level HTM hierarchy communicating information within levels, between levels, with outside the HTM hierarchy according to some embodiments of the present disclosure.

FIG. 3 illustrates a schematic diagram of an exemplary four-level HTM hierarchy communicating information within levels, between levels, with outside the HTM hierarchy according to some embodiments of the present disclosure. As shown in FIG. 3, multiple elements in a child region converge onto one element in a parent region ascending the hierarchy ascends, and information diverges descending the hierarchy.

In the application of the autonomous driving system, the HTM model may have a substantially large number of levels and a substantially large number of elements to capture a substantially large number of measurement signals. As such, some dimension reduction processing can be performed to reduce the size of the HTM model. The dimension reduction processing removes redundant information that does not contribute to the error event analysis, and makes the error event analysis more efficient.

An HTM region learns from the signal states by finding patterns or sequences of the patterns in the signal states. The HTM region looks for combinations of the signal states that occur together often, that is, spatial patterns, and then looks for how the spatial patterns appear in sequence over time, that is, temporal patterns or sequences. For example, if one signal represents a lane merge sign, and another signal representing a lane maneuvering follows immediately, the HTM region learns the signal of the lane merge sign always leads to the signal of the lane maneuvering. Like a biological system, the learning algorithms in the HTM region are capable of continually learning from newly inputted signal states. There is no need for a learning phase separate from an inference phase. As the patterns in the inputted signal states change, the HTM region adapts accordingly.

After learning some patterns in the inputted signal states, the HTM model can perform inference on a sequence of signal states that need to be analyzed. When receiving the sequence of signal states, the HTM model will match the sequence of signal states with previously learned spatial and temporal patterns. Successfully matching the signal state to previously stored sequence of patterns will result in a prediction in a prediction iteration. As more signal states are fed into the prediction model, more predictions can be made in more prediction iterations. The prediction made in each prediction iteration is stored and used for tracing back the error event later.

Every region of the HTM model stores sequences of patterns. By matching stored sequences with inputted signal states, the region forms the prediction about what signal state will likely arrive next. As more signal states arrive, more predictions will be made. The prediction will occur at each of level of the HTM hierarchy. The prediction is based on what has occurred in the past as well as what currently occurs. Thus, a same signal state may produce different predictions based on previous context.

In the HTM model, the region doesn't just predict what will happen in an immediately next step. If possible, the region will predict multiple steps ahead in time. For example, the region can predict five steps ahead.

Referring back to FIG. 1, at S104, the error event is converted into an event signal state having signal values at an event time.

In some embodiments, the signal states collected from the autonomous driving system are in the form of time-series signal values and at least include an error event. As previously described, the signals at time T form the signal state at time T. In other words, the signal states include a sequence of the signal states that are timestamped. In order to take the advantage of the prediction model, the error event needs to be converted into a format similar to a signal state. The conversion may be performed by the electronic device after the user of the electronic device enters the error event into the electronic device through an input interface of the electronic device. Alternatively, the user may convert the error event into the event signal state that captures signal values at the time when the error event occurs.

After the sequence of signal states are fed into the prediction model that has been trained, one or more signal states that cause the event signal state may be obtained. Because the prediction model is continuously trained, the prediction model is considered to be trained after a large amount of the signal states have been fed into the prediction model. As the prediction model is trained continuously with more and more signal states, a prediction accuracy of the prediction model improves.

At S106, the second signal state is compared with the event signal state.

In some embodiments, the prediction model predicts the second signal state based on the first signal state. The second signal state will be compared with the event signal state to determine whether the event signal state can be traced back to a first signal state. As previously described, the prediction model may predict the second signal state beyond an immediate next step in time. For example, the prediction model may predict the second signal state five steps in time ahead of the first signal state. In this case, the error event may be traced back to the first signal state that is five steps prior to the error event.

In some embodiments, matching the second signal state with the event signal state includes matching signal values of the second signal state with signal values of the event signal state.

In some embodiments, the event signal state includes signal values only for error event related signals, and matching the signal values of the second signal state with the signal values of the event signal state includes matching the signal values of a portion of signals in the second signal state that correspond to the error event related signals with the signal values of the error event related signals in the event signal state.

In some embodiments, the signal states predicted by the prediction model are stored, such that the error event can be traced back to not only an immediate signal state that causes the prediction model to predict the error event, but also a past signal state that causes the prediction model to predict the immediate signal state. In each prediction cycle, the error event is traced one hop back. Each tracing back operation is called a tracing iteration. Through storing the predicted signal states, a chain of signal states may be obtained to iteratively trace back the error event in a plurality of tracing iterations. The chain of signal states can be considered as the root cause of the error event.

In some embodiments, tracing the error event back to the first signal state as the root cause in response to the second signal state matching the error event includes searching the sequence of signal states for a pattern previously learned by the prediction model, the pattern including the first signal state and the second signal state that are correlated; and in response to the event signal state appearing in the pattern as the second signal state, identifying the first signal state as the root cause for the error event.

During the operation of the prediction model, the prediction model searches previously learned patterns in the sequence of the signal states and calculates a probability score for each matched pattern. When the probability score is greater than a pre-determined threshold, the prediction model makes a prediction based on the matched pattern, that is, identifying the first signal state in the matched pattern as the signal state that causes the prediction model to predict the second signal state, that is the event signal state.

In some embodiments, the matched pattern at least includes the first signal state (i.e., the root cause) and the second signal state (i.e., the error event). The first signal state and the second signal state may be separated by multiple steps in time. Further, the first signal state may include a plurality of first signal states. In other words, the matched pattern may include the plurality of first signal states. Thus, the plurality of first signal states jointly can cause the second signal state to occur.

At S108, in response to the second signal state matching the event signal state, the error event is traced back to the first signal state as a root cause.

In some embodiments, identifying the first signal state that causes the prediction model to predict the second signal state may be performed iteratively to obtain a chain of the signal states leading toward the error event. After identifying the first signal state as the root cause for the error event in a first tracing iteration, another first signal state can be identified as a root cause for the first signal state identified in the first tracing iteration. The above step may be repeated to obtain a chain of first signal states as the root cause for the error event.

Figure 4:
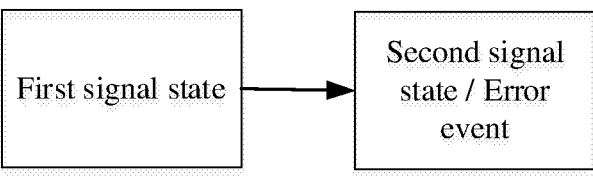
FIGS. 4-8 illustrate schematic diagrams of various signal state traces according to some embodiments of the present disclosure.

In some embodiments, the error event is traced back to the first signal state. The first signal state is considered as the root cause for the error event, as shown in FIG. 4. A further action may be performed based on the first signal state. At this point, a complete prediction cycle of automatically tracing back the error event in the signal states collected from the autonomous driving system is concluded.

In some embodiments, after the error event has been traced back to its root cause, the root cause may be outputted on a display of the electronic device.

In some embodiments, the prediction model is the HTM model, and the first signal state is in the form a sparsely distributed matrix of signal values. The root cause of the first signal state can be narrowed down to specific signal values in the sparsely distributed matrix of signal values.

In some embodiments, after the error event has been traced back to its root cause, an action may be performed to prevent the error event from reoccurring based on the root cause.

In some embodiments, if the signal values of the first signal state indicate a hardware related issue, the action may include an instruction for a service person to replace a specific part of the autonomous driving system. If the signal values of the first signal state indicate a software bug, the action may include updating the autonomous driving system with a software release that includes the software bug fix. If the signal values of the first signal state indicate both the hardware related issue and the software bug, the action may include the instruction for the service person to replace the specific part of the autonomous driving system and updating the autonomous driving system with the software release that includes the software bug fix.

Figure 5:
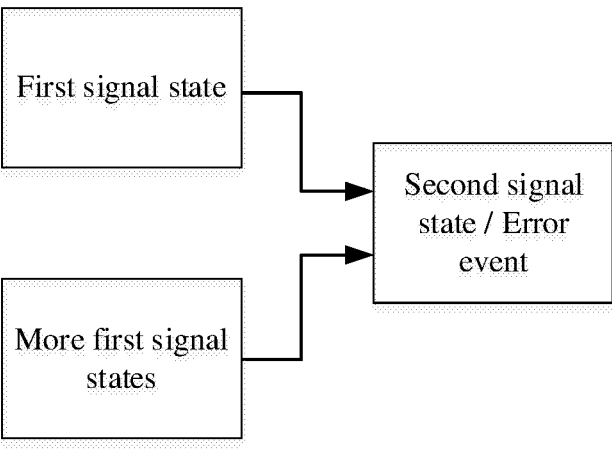

In some embodiments, during the process of identifying the first signal state that causes the prediction model to predict the second signal state (i.e., the error event), the matched pattern also may include more than one first signal states. Consequently, multiple first signal states are also considered as the root cause for the error event. In this case, the error event and multiple first signal states are generated in a single prediction cycle, as shown in FIG. 5. As shown in FIG. 5, the root cause for the error event is a collection of multiple first signal states. For example, multiple events that occur at different times prior to the time the error event occurs jointly cause the error event.

Figure 6:
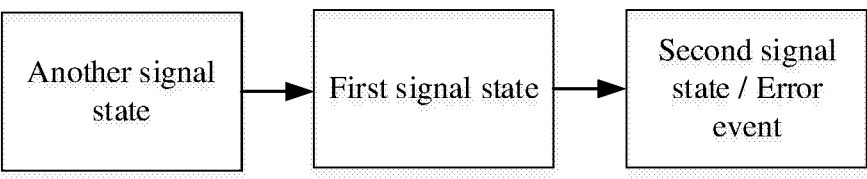

In some embodiments, the first signal state that causes the prediction model to predict the second signal state may be identified iteratively to obtain a sequence of signal states leading toward the error event. That is, after the first signal state that causes the prediction model to predict the second signal state is identified, another signal state that causes the prediction model to predict the first signal state is identified. Consequently, the entire sequence of signal states is considered as the root cause for the error event. In this case, the error event, and the sequence of signal states are generated after multiple prediction cycles, as shown in FIG. 6. As shown in FIG. 6, the root cause for the error event is the another signal state the causes the prediction model to predict the first signal state.

Figure 7:
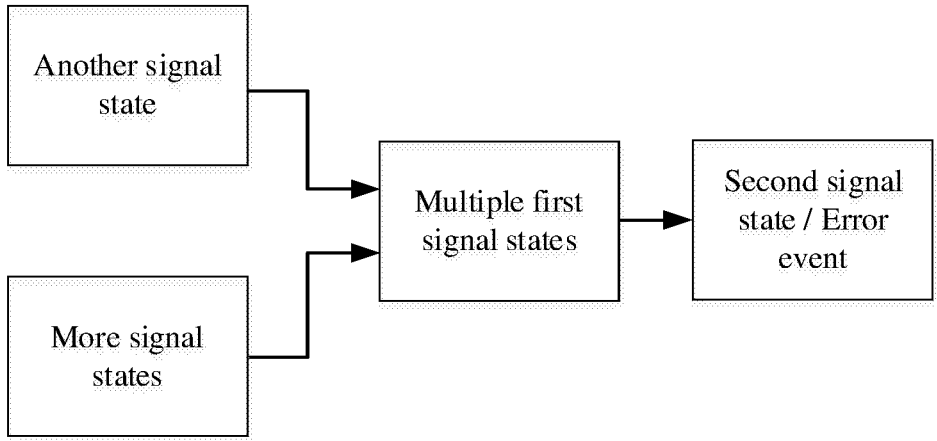

In some embodiments, when identifying the first signal state iteratively, multiple first signal states need to be traced back. In this case, the error event, multiple first signal states, more signal states that cause the prediction model to predict each of the multiple first signal states are generated in two prediction cycles, as shown in FIG. 7.

Figure 8:
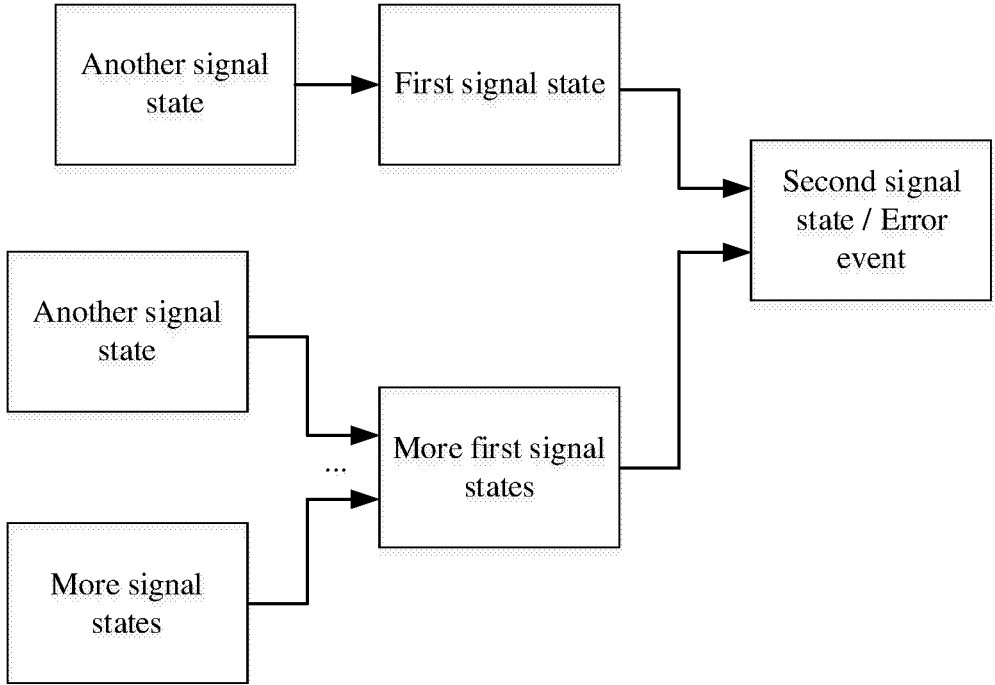

In some embodiments, when identifying the first signal state iteratively, the second signal state may be traced back to multiple first signal states, and each of the multiple first signal states are further traced back. In this case, the error event, the multiple first signal states, and more signals states that cause the prediction model to predict each of the multiple first signal states, respectively, are generated in multiple prediction cycles, as shown in FIG. 8.

Based on the process of tracing back the sequence of the signal states as described above, more variations of the sequence of the traced back signal states may be generated in multiple prediction cycles and outputted graphically as shown in FIGS. 4-8. Alternatively, the sequence of the traced back signal states may be presented in a text format or a text and graphics hybrid format.

In the embodiments of the present disclosure, the predict model is used to automatically generate the sequence of the signal states that trace back to the error event. The automatic generation of the sequence of the signal states substantially cuts down the time and man power for identifying the root cause of the error event. Thus, the autonomous driving system may be improved constantly and more efficiently.

The present disclosure further provides an electronic device for error event root cause analysis. The electronic device automatically traces an error event in signal states collected from an autonomous driving system.

Figure 9:
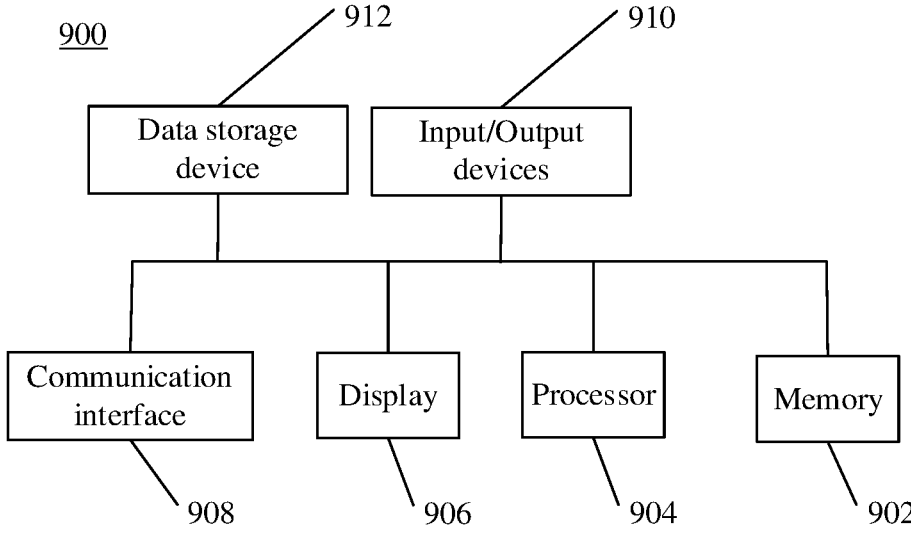
FIG. 9 illustrates a block diagram of an exemplary system for automatically tracing an error event in signals collected from an autonomous driving system according to embodiments of the present disclosure.

FIG. 9 illustrates a block diagram of an exemplary electronic device for error event root cause analysis according to embodiments of the present disclosure. As shown in FIG. 9, the electronic device 900 may include a memory 902, a processor 904, a communication interface 908, input/output devices 910, and a data storage device 912, etc. Other devices may also be included. The processor 904 may include any appropriate hardware processor or processors. Further, the processor 904 can include multiple cores for multi-thread or parallel processing and can include graphics capability for processing for a human-machine interface (HMI) (i.e., an example of input/output devices 910). The memory 902 may include any appropriate memory modules, such as ROM, RAM, flash memory modules, and erasable and rewritable memory, and mass storages, such as CD-ROM, DVD, U-disk, and hard disk, etc. The memory 902 may store computer program instructions or program modules for implementing various processes, when executed by the processor 904, to perform the method for error event root cause analysis and automatically trace the error event in the signal states collected from the autonomous driving system.

Further, the electronic device 900 may include a display 906. The display 906 may be any suitable display technology suitable to display an image or a video. For example, the display 906 may include a liquid crystal display (LCD) screen, an organic light-emitting diode (OLED) screen, or the like, and may be a touch screen. The communication interface 908 may include certain network interface devices for establishing connections through communication networks. The input/output devices 910 may include any appropriate input devices to input information to the processor 904 and/or output devices to output information from the processor 904, such as keypads, keyboards, and mouse devices, cameras, microphones, and other sensors, etc. Further, the data storage device 912 may include one or more data stores for storing certain data and for performing certain operations on the stored data, such as database searching, model training, etc. Due to limited memory size of the autonomous driving system, the signals collected from the autonomous driving system may be stored in the data storage device 912.

The present disclosure further provides an automatic driving system. The automatic driving system includes the disclosed electronic device for error event root cause analysis. The autonomous driving system is able to automatically trace an error event in signal states collected from the autonomous driving system. For the operation principle of the autonomous driving system, references can be made to the description of the embodiments of the electronic device for error event root cause analysis, and detailed description is omitted herein.

In the embodiments of the present disclosure, the predict model is used to automatically generate the sequence of the signal states that traces back to the error event. The automatic generation of the sequence of the signal states substantially cuts down the time and man power for identifying the root cause of the error event. Thus, the autonomous driving system may be improved constantly and more efficiently.

The foregoing embodiments describe in detail the objective, the technical solution, and the beneficial effect of the present disclosure. The foregoing disclosed embodiments are only some of the embodiments of the present disclosure rather than all of the embodiments of the present disclosure, which should not be used to limit the scope of present disclosure. Other embodiments obtained by those having ordinary skills in the art on the basis of the described embodiments without inventive efforts should fall within the scope of the present disclosure. Further, under circumstances of no conflict, embodiments and features in the embodiments may be combined with each other. Therefore, any changes, equivalent replacements, and modifications made according to the present disclosure still fall within the scope of the present disclosure.

What is claimed is:

1. A method for error event analysis, performed by an electronic device, the method comprising:

in response to an error event of an autonomous driving system, feeding a sequence of signal states of the error event and collected from the autonomous driving system into a prediction model that has been trained, wherein the prediction model is used for predicting, based on a first signal state, a second signal state, the first signal state representing signals collected at a first time, and the second signal state representing signals collected at a second time succeeding the first time;

converting the error event into an event signal state having signal values at an event time;

comparing the second signal state with the event signal state;

in response to the second signal state matching the event signal state, tracing the error event back to the first signal state as a root cause, by performing:

searching the sequence of signal states of the error event for a pattern that includes the first signal state and the second signal state, determining that the matched event signal state appears in the pattern, using the matched event signal state as the second signal state, wherein the second signal state is predicted from the first signal state, and identifying the first signal state in the pattern corresponding to the second signal state as the root cause for the error event;

after identifying the first signal state as the root cause for the error event in a first tracing iteration, identifying another first signal state as another root cause for the first signal state identified in the first tracing iteration;

repeatedly identifying additional first signal state to obtain a chain of first signal states, the chain of signal states being considered as the root cause for the error event;

storing a plurality of signal states predicted by the prediction model such that the error event can be traced back to both an immediate signal state that causes the prediction model to predict the error event and a past signal state that causes the prediction model to predict the immediate signal state; and controlling the autonomous driving system by performing an action to prevent the error event from reoccurring based on the root cause.

2. The method according to claim 1, further comprising:

outputting the root cause on a display of the electronic device.

3. The method according to claim 1, wherein:

the signal states include measurement data measured by sensors of the autonomous driving system and are collected at a predetermined time interval from the autonomous driving system to become the sequence of signal states that are used in error event analysis.

4. The method according to claim 3, wherein:

the sequence of signal states further includes abstraction signals that are extracted from the measurement data measured by sensors of the autonomous driving system and local knowledges including local maps and local rules and regulations.

5. The method according to claim 1, wherein:

matching the second signal state with the event signal state includes matching signal values of the second signal state with signal values of the event signal state.

6. The method according to claim 5, wherein:

the event signal state includes signal values only for error event related signals; and matching the signal values of the second signal state with the signal values of the event signal state includes matching the signal values of a portion of signals in the second signal state that correspond to the error event related signals with the signal values of the error event related signals in the event signal state.

7. The method according to claim 1, wherein the pattern including the first signal state and the second signal state is previously learned by the prediction model.

8. The method according to claim 1, wherein:

the prediction model is a Hierarchical Temporal Memory (HTM) model; and each signal state is a sparsely distributed matrix of signal values.

9. An electronic device for error event analysis, comprising a processor and a memory coupled to the processor and storing program instructions, wherein when being executed by the processor, the program instructions cause the processor to:

in response to an error event of an autonomous driving system, feed a sequence of signal states of the error event and collected from the autonomous driving system into a prediction model that has been trained, wherein the prediction model is used for predicting, based on a first signal state, a second signal state, the first signal state representing signals collected at a first time, and the second signal state representing signals collected at a second time succeeding the first time;

convert the error event into an event signal state having signal values at an event time;

compare the second signal state with the event signal state;

in response to the second signal state matching the event signal state, trace the error event back to the first signal state as a root cause, by performing: searching the sequence of signal states of the error event for a pattern that includes the first signal state and the second signal state, determining that the matched event signal state appears in the pattern, using the matched event signal state as the second signal state, wherein the second signal state is predicted from the first signal state, and identifying the first signal state in the pattern corresponding to the second signal state as the root cause for the error event;

after identifying the first signal state as the root cause for the error event in a first tracing iteration, identify another first signal state as another root cause for the first signal state identified in the first tracing iteration;

repeatedly identify additional first signal state to obtain a chain of first signal states, the chain of signal states being considered as the root cause for the error event;

store a plurality of signal states predicted by the prediction model such that the error event can be traced back to both an immediate signal state that causes the prediction model to predict the error event and a past signal state that causes the prediction model to predict the immediate signal state; and control the autonomous driving system to perform an action to prevent the error event from reoccurring based on the root cause.

10. The electronic device according to claim 9, wherein the processor is further configured to:

output the root cause on a display of the electronic device.

11. The electronic device according to claim 9, wherein:

the signal states include measurement data measured by sensors of the autonomous driving system and are collected at a predetermined time interval from the autonomous driving system to become the sequence of signal states that are used in error event analysis.

12. The electronic device according to claim 11, wherein:

the sequence of signal states further includes abstraction signals that are extracted from the measurement data measured by sensors of the autonomous driving system and local knowledges including local maps and local rules and regulations.

13. The electronic device according to claim 9, wherein:

matching the second signal state with the event signal state includes matching signal values of the second signal state with signal values of the event signal state.

14. The electronic device according to claim 13, wherein:

the event signal state includes signal values only for error event related signals; and matching the signal values of the second signal state with the signal values of the event signal state includes matching the signal values of a portion of signals in the second signal state that correspond to the error event related signals with the signal values of the error event related signals in the event signal state.

15. The electronic device according to claim 9, wherein the pattern including the first signal state and the second signal state that is previously learned by the prediction model.

16. An autonomous driving system, comprising an electronic device for error event analysis, wherein:

the electronic device includes a processor and a memory coupled to the processor and storing program instructions, wherein when being executed by the processor, the program instructions cause the processor to:

in response to an error event of an autonomous driving system, feed a sequence of signal states of the error event and collected from the autonomous driving system into a prediction model that has been trained, wherein the prediction model is used for predicting, based on a first signal state, a second signal state, the first signal state representing signals collected at a first time, and the second signal state representing signals collected at a second time succeeding the first time;

convert the error event into an event signal state having signal values at an event time;

compare the second signal state with the event signal state;

in response to the second signal state matching the event signal state, trace the error event back to the first signal state as a root cause, by performing: searching the sequence of signal states of the error event for a pattern that includes the first signal state and the second signal state, determining that the matched event signal state appears in the pattern, using the matched event signal state as the second signal state, wherein the second signal state is predicted from the first signal state, and identifying the first signal state in the pattern corresponding to the second signal state as the root cause for the error event;

after identifying the first signal state as the root cause for the error event in a first tracing iteration, identify another first signal state as another root cause for the first signal state identified in the first tracing iteration;

repeatedly identify additional first signal state to obtain a chain of first signal states, the chain of signal states being considered as the root cause for the error event;

store a plurality of signal states predicted by the prediction model such that the error event can be traced back to both an immediate signal state that causes the prediction model to predict the error event and a past signal state that causes the prediction model to predict the immediate signal state; and control the autonomous driving system to perform an action to prevent the error event from reoccurring based on the root cause.

17. The system according to claim 16, wherein:

the signal states include measurement data measured by sensors of the autonomous driving system and are collected at a predetermined time interval from the autonomous driving system to become the sequence of signal states that are used in error event analysis.

18. The system according to claim 17, wherein:

the sequence of signal states further includes abstraction signals that are extracted from the measurement data measured by sensors of the autonomous driving system and local knowledges including local maps and local rules and regulations.

* * * * *